Aug. 5, 1924.
M. BERNDT
PENCIL SHARPENING MACHINE
Filed Aug. 9, 1923   2 Sheets-Sheet 1
1,504,019
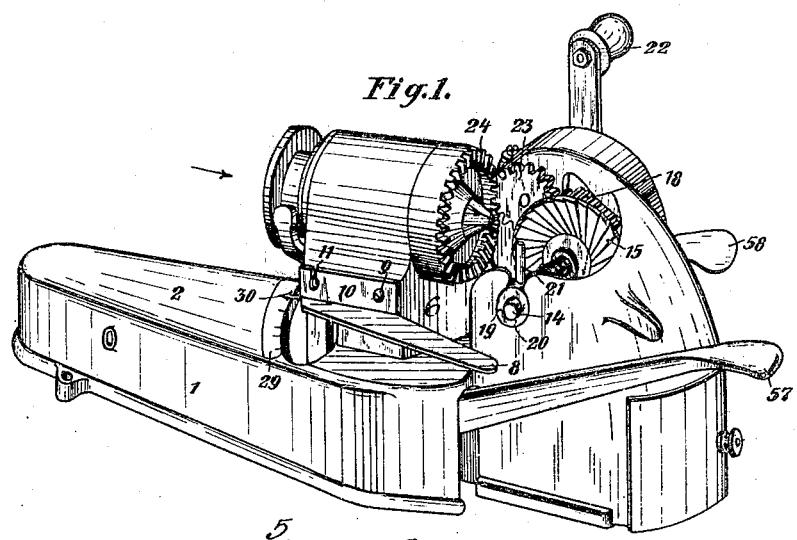
Fig.1.
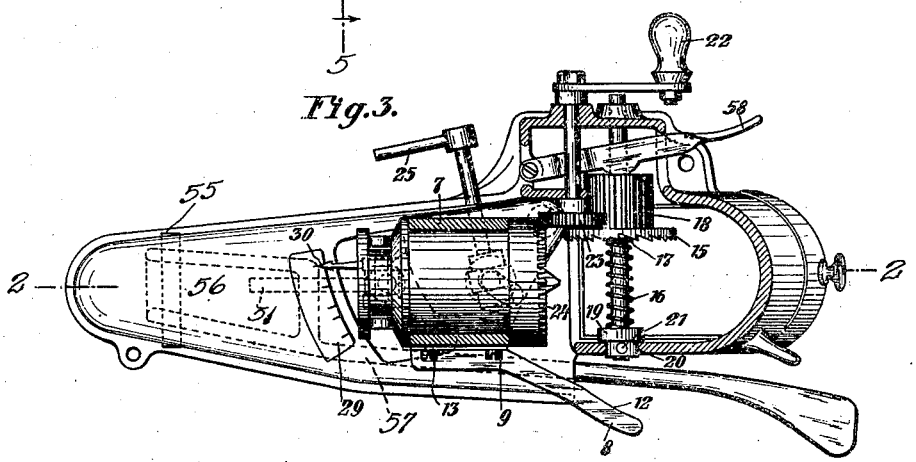
Fig.2.
Fig.3.
Inventor:
Martin Berndt
By  his Attorney Aug. 5, 1924.                                                     1,504,019
                            M. BERNDT
                     PENCIL SHARPENING MACHINE
                      Filed Aug. 9, 1923      2 Sheets-Sheet 2
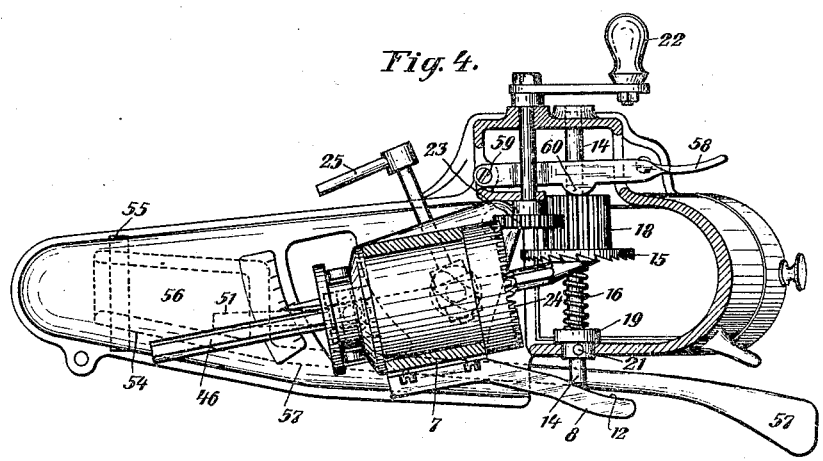
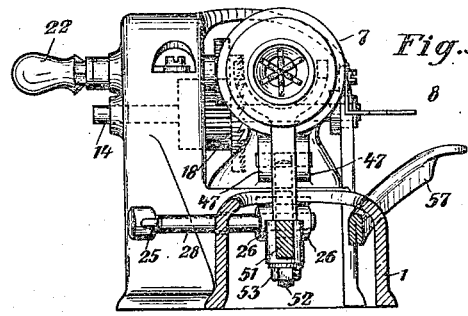
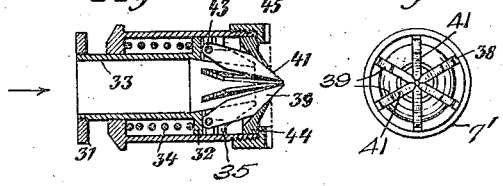 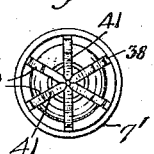 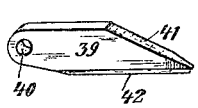
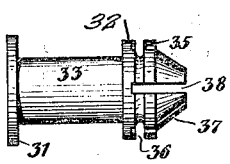
Inventor
Martin Berndt
By
   Attorney Patented Aug. 5, 1924.

1,504,019

UNITED STATES PATENT OFFICE.

MARTIN BERNDT, OF EUTRITZSCH, NEAR LEIPZIG, GERMANY, ASSIGNOR TO THE FIRM OF INDUSTRIE-DIENST-EIN- UND AUSFUHR GESELLSCHAFT MIT BESCHRÄNKTER HAFTUNG, OF LEIPZIG, SAXONY, GERMANY.

PENCIL-SHARPENING MACHINE.

Application filed August 9, 1923. Serial No. 656,474.

*To all whom it may concern:*

Be it known that I, MARTIN BERNDT, a citizen of the German Republic, residing at Eutritzsch near Leipzig, Germany, have invented certain new and useful Improvements in Pencil-Sharpening Machines, of which the following is a specification.

My invention relates to a pencil sharpening machine and more particularly to a machine of the kind in which a cutter-disk is provided on a manually operatable shaft for cutting and sharpening the pencil which is firmly clamped and supported in a chuck adapted to rotate synchronously with the revolution of the manually driven cutter-disk.

In this type of pencil sharpening machines the feed of the cutter-disk is brought about by means of a hand-lever acting to press the said cutter-disk laterally and obliquely against the point of the rotating pencil, so that the operator can readily take care to not cut off more than required for obtaining a good point. Nevertheless it may happen that by carelessness excessive cutting and shortening of the pencil occurs.

The main object of my invention is to provide means for preventing any excessive feed of the cutter-disk and to thereby avoid loss of useful material. Viewing this object, however, it must be taken in consideration that the chuck carrying the pencil preferably is mounted in an adjustable manner, that is to say, so as to be adapted to bodily turn in a horizontal plane for the adjustation purpose, whereby the pencil point will be brought to the proper angular position with respect to the cutter-disk. For pencils of different thickness require differently adjusted positions with relation to the cutter-disk. Hence from the movability of the chuck certain difficulties arise which have to be taken into account at the realization of the problem to be solved.

With the above object in view I connect with the chuck or the carrier thereof, properly speaking, an abutment member or stop projecting from the chuck or its carrier to normally lie in a horizontal plane coinciding with the horizontal plane of the axis of the shaft of the cutter-disk, and I give the face or edge of said abutment member or stop opposite to the shaft of the cutter-disk a contour or shape which will prevent the cutter-disk, no matter how the chuck has been adjusted, from unduly or excessively advancing towards the pencil point, that is to say, cutting off from the pencil more material than required for obtaining a sharp point.

Since the shape of the conical point to be cut depends upon the adjustation or angular position to which the chuck has been set with respect to the shaft carrying the cutter-disk, the said edge or face of the abutment member or stop must be shaped to form a cam the curve of which is found by practical experience. Various other objects and advantages will become apparent during the continuance of the following description.

Having thus set forth the principles upon which my invention depends and having shown the particular improvements effected over the prior art, I shall now particularly describe by way of example a simple embodiment thereof which I have shown in the accompanying drawings for the purpose of more fully disclosing my invention.

In the drawing:

Figure 1 is a perspective view of the machine,

Figure 2 represents a vertical section on the line 2—2 of Fig. 3.

Figure 3 which represents a horizontal section on the line 3—3 of Figure 2,

Figure 4 is a similar section with the chuck set in operative position,

Figure 5 represents a vertical section on the line E—F of Figure 2 and

Figures 6, 7, 8 and 9 illustrate single parts of the machine, partly in section and partly on an enlarged scale.

Similar reference characters refer to similar parts in each of the several views.

The frame of the machine forming at the same time a kind of a casing 1 is shaped to form a flat platform 2 having an elongated opening or slot 3 for a screw-bolt 5 with a flat head or collar 4 to pass therethrough in order to be screwed into the bottom of the carrier 6 supporting the chuck 7. The lower end or head of the bolt 5 is suitably connected with the means employed for moving the bolt in the slot 3 in order to turn the chuck about a pivot pin as required for setting or adjusting the same with relation to the cutter-disk in accordance with the thickness of the pencil to be sharpened and the particular conical shape to be given to the point thereof.

At the one side face of the carrier 6 the abutment member or stop 8 for the lengthwise displaceable shaft of the cutter-disk is pivotally mounted on a pivot in the shape of a screw 9, as shown. The said member or stop 8 consists of an angle-iron the vertical shank 10 of which is attached to the carrier 6 by means of the screw 9 whilst its horizontal shank is elongated to project beyond the axial line of the shaft of the cutter-disk. The shank 10 of the member or stop 8 is slotted as at 11 to afford a seat for a pin in the shape of a screw 13, as shown in Figure 3, fixed in the carrier 6. As will be seen from Figures 1 and 5 the elongated shank of the member or stop 8 is in the path 14 of the cutter-disk when the slot 11 engages the pin or screw 13, but if the member or stop 8 is turned about its pivot 9 and the elongated shank is thereby moved upwards and out of its horizontal position, the abutment member or stop 8 will be in an inactive relationship with respect to the shaft 14.

The inner edge 12 of the elongated shank of the member or stop 8 is suitably curved, as will be seen from Figure 3, to answer its purpose and extends in Figure 3, in conformity with Figure 1, in the horizontal plane in which the axis of the shaft 14 of the cutter-disk is situated. The member or stop 8 may be turned upwards and thereby removed from its horizontal position, shown in Figure 1, in case that the pencil-lead is wanted to be totally freed from its wooden housing, or in case that the pencil-lead, as frequently occurs in pencils of inferior value, is not centrally or axially encased in its wooden housing, so that the sharpening if not counter-acted, would result in an oblique non-conical lead point. In a case like this the cutter-disk is to be forced towards the pencil, by means of the hand lever 58, to adopt a position a little only off the median line 2—2 in Figure 3 which could not be done, if the member or stop 8 were in its horizontal or stopping position, as will be readily understood from Figure 4. A further advance as far as or beyond the median line 2—2 is not to be given the cutter-disk except in case of replacing a worn-off disk by a new one.

The spring 16 loosely coiled about the shaft 14 engages with its one end a hub 17 integral with the pinion 18 keyed to the shaft 14, whilst the other end of the spring abuts against a bushing or sleeve 19 mounted in a slotted opening 20 of the casing 1 and affording a bearing for the shaft 14. The said bushing or sleeve 19 is provided with a kind of a handle 21 to facilitate its insertion in the opening 20, and the hub 17 is screw-threaded for the reception of the cutter-disk 15 having corresponding female thread.

By displacing the bushing 19 on the shaft 14, against the action of the spring 16, towards the cutter-disk 15 so as to be disengaged from the circular part of the slotted opening 20, the shaft, the cutter-disk and the pinion can be removed from the machine as a unit owing to the slot-like shape of the opening 20, as will be readily understood on inspection of Figure 1. In this way simple and efficient means are provided for a renewal of the cutter-disk when worn off.

By turning the handle 22 a gear or pinion 23 engaging with the pinion 18 and, on the other side, with the toothed rim or edge 24 of the chuck, is caused to rotate and to impart rotary motion to both the cutter-disk 15 and the chuck 7 holding the pencil 46. The means for adjusting or setting the chuck to the desired angular position with respect to the cutting face of the cutter-disk comprises two cams 26 on a shaft 28 duly supported in bearing holes of the wall of the casing and in the extension 27 of the head 4 of the screw-bolt 5, and provided with a crank or handle 25, as will be clearly seen in Figures 3 to 5.

The value of the angle at which the axis of the chuck is set with relation to the plane of the cutter-disk 15 can be read on a scale 29 provided on the platform 2, with the aid of a pointer 30 firmly attached to the rear of the chuck 7.

The particular construction of the chuck is an essential feature of my invention. The chucks hitherto in use in connection with similar machines are deficient inasmuch as they fail to ensure an accurately conaxial position of the pencil and further fail to hold the pencil with sufficient rigidity, so that the pencil will recede at the impact of or engagement with the cutters or cutting blades and a correctly conical point cannot always be obtained in the machines hitherto devised.

To remedy this defect I provide in the cylindrical casing 7' of the chuck a sleeve 33 having annular flanges 31 and 32, respectively, at its ends and mounted to be slidable in said casing in accurately conaxial alinement therewith, both in the one direction through the agency of a spring 34 coiled about the body of the sleeve and in the other direction by manually or mechanically withdrawing the sleeve from the casing by means of the outer flange 31, as will be clearly understood from an inspection of Figure 6.

In front of the inner flange 32 a third annular flange 35 is provided on the sleeve a distance apart from the flange 32 so that the space intermediate between the two flanges forms an annular groove 36. The end 37 of the shell projecting from the flange 35 is of conical shape and six radial slots 38 are provided therein. These slots 38 extend inwards as far as the flange 32 and six self-centering jaws 39 of pawl-like shape with a pivot-hole 40 at the inner end and a slanting edge 41 at the other end, are inserted in said slots 38 to snugly fit therein so that the holes 40 will lie in the groove 36, as clearly shown in Figure 6.

In order to pivotally interconnect the six jaws 39 in their assembled position a wire 43 is threaded through the holes 40 thereof, prior to the insertion of the jaws, and upon inserting the single jaws successively into the slots 38 care is to be taken to at the same time embed the contiguous parts of the wire into the groove 36. The two ends of the wire which is to be cut to the proper length to form a ring, are not firmly united in order to allow the jaws to properly yield.

The inner end of the casing of the chuck is closed by a conical insert 44 having a central opening of a size or diameter corresponding to the thickness or diameter of the biggest pencil that might have to be sharpened in the machine. The inner face of the conical insert 44 is sloped to coincide with the slanting edges or faces 41 of the jaws 39 when the parts are in normal or inoperative position with the jaws fully closed and no pencil clamped therebetween, as shown in Figure 6. In this normal position the points of the jaws 39 meet and the edges 42 of the jaws lie in a conical face ready for the reception of a pencil. A threaded ring 45 with a toothed outer edge 24 is screwed upon the inner end of the casing of the chuck to hold the insert 44 in place.

On withdrawing the sleeve 33 from the casing against the pressure of the spring 34, the jaws 39 will be disengaged from the stationary insert 44 and be free to turn about their pivot wire ring 43, so that a pencil can be introduced into the sleeve and between the jaws without any noticable resistance of the jaws to be overcome. But as soon as the sleeve 33 is released the spring 34 will act to force the sleeve in opposite direction towards the insert 44, whereby the edges or faces 41 of the jaws come in contact with the inner conical face of the insert and the edges 42 of the jaws will grip and clamp the pencil to firmly hold the same in an exactly conaxial position with relation to the chuck, so that the former can neither turn nor be displaced lengthwise in the chuck.

The sleeve 33 can be withdrawn for the insertion of a pencil immediately by hand, preferably, however I provide a mechanical means for the purpose. To this aim I provide a forked lever 49 having its fulcrum at 48 in a bracket projecting from the carrier 6 of the chuck 7, and engaging with its forked arm 50 the sleeve 33 in close proximity of the flange 31 thereof, whilst the extremity of the depending arm 47 of the lever is shaped to form a pivot 52 for the reception of the hub of an arm or bar 51 secured to the arm 47 by means of a nut 53 so as to be free to turn about the pivot 52 in a horizontal plane. The bar 51 projects between two flanges 54 of a bridge 56 integral with a hand-lever 57 and forming the inner end thereof. The bridge 56 or lever 57 is mounted on a horizontal pin 55 fixed in the frame or casing 1 and acting as a pivot for the lever 57 to turn thereabout.

It will be seen that by pressing the hand-lever 57 down the bridge 56 will likewise move downwards (about the pivot 55) and the movement of the bridge will be transmitted through the bar 51 to the lever 49 which in turn will rotate about its pivot 48 whereby the sleeve 33 will be withdrawn or partly extracted from its casing and the jaws 39 therein will be free for the accommodation of a pencil. Upon releasing the hand-lever 57 the spring 34 in the casing of the sleeve 33 will act to return the sleeve into its former position as far as the jaws 39 holding the pencil firmly clamped between them and stopped by the insert 44 allow.

It will be understood that it is necessary to pivotally attach the bar 51 to the depending arm of the lever 49 so as to afford the bar a free play between the two flanges 54 of the bridge 56, in order to compensate for the various angular positions the chuck may be given. The hand-lever 58 is pivotally mounted at 59 in the wall of the casing 1 and provided with a nose 60 engaging the pinion 18 so that by manually exercising a pressure on the lever the pinion and the cutter-disk will be fed towards the pencil point.

The operation of the entire sharpener is as follows:

The lead pencil is inserted into the chuck 7 in the direction of the arrow shown in Figures 1 and 6, while at the same time a pressure is manually exercised on the lever 57, whereby the sleeve 33 and the jaws 39 are withdrawn against the action of the spring 34, so that the pencil being pushed inwards can force the jaws out of the way by turning them about their common pivot 43. In this way the pencil can be brought to a position, with regard to the chuck, similar to that shown in Figure 1 but with the point still unsharpened. Upon releasing the lever 57 the spring 34 acts to shift the sleeve and the parts connected therewith, forwards again, that is in the direction of the arrow, whereby the jaws are immobilised by contacting with the insert 44 and holding the pencil clamped between them, the power of the spring being sufficient to ensure a firm hold.

The pencil thus being held in a proper position for engagement with the cutter-disk 15, the lever 58 is manually pressed inwards whilst at the same time the handle 22 is to be turned by hand, so that the cutter-disk will be shifted lengthwise on the shaft 14 and come in contact with the end of the pencil, to be sharpened and at the same time the cutter-disk will be driven by the gearing 18, 23 to cut the pencil as shown in Fig. 1. By increasing or decreasing the pressure to be exercised on the lever 58 the cutting operation can be accelerated or retarded, respectively. When the pencil is properly sharpened, the pressure on the lever 58 and the turning of the handle 22 is stopped, whereupon the lever 57 is manually pressed down again in order to disengage the chuck from the pencil. The pencil then is removed from the chuck in the direction opposed to that of the arrow.

Although I have herein shown and described only one form of the device embodying my invention, it is to be understood that various changes and modifications may be made herein without departing from the spirit of my invention and the spirit and scope of the appended claims.

What I claim is:—

1. A pencil sharpening machine of the type set forth, comprising, in combination with a casing a lengthwise movable rotatable shaft, two bearings in said casing for the shaft, the one bearing consisting of a removable bushing or sleeve in a slotted opening, a cutter-disk rigidly connected with said shaft, means for imparting rotary motion to said shaft and cutter-disk, a means for moving the shaft with the cutter-disk lengthwise, and a movable abutment or stop having a projecting shank with a curved or cam-shaped operative edge, substantially as set forth.

2. The pencil-holding chuck 7, having a sleeve, 33, with an annular groove, 36, and a number of clamping jaws, 39, yieldingly secured in said groove by means of an open wire ring, 43, substantially as shown, for the purpose specified.

3. The pencil-holding chuck 7, having a sleeve 33 with a number of yieldingly secured jaws, 39, a controlling forked lever, 49, engaging the said sleeve and having a vertical pivot-arm, 47, 52, with a rotary horizontal arm 51, attached thereto and engaging from below the bridge-shaped end, 56, of a hand-lever, 57, pivotally mounted on a horizontal pin 55, substantially as and for the purpose set forth.

In testimony whereof I affix my signature.

MARTIN BERNDT.